United States Patent [19]
Rohde

[11] Patent Number: 6,005,367
[45] Date of Patent: Dec. 21, 1999

[54] SMART POWER SYSTEM

[75] Inventor: Monty D. Rohde, Lincoln, Nebr.

[73] Assignee: Centurion International, Inc., Lincoln, Nebr.

[21] Appl. No.: 09/114,826

[22] Filed: Jul. 14, 1998

[51] Int. Cl.[6] .................................................... H02J 7/00
[52] U.S. Cl. ............................................. 320/106; 320/110
[58] Field of Search ...................................... 320/106, 109, 320/110, 125, 126

[56] References Cited

U.S. PATENT DOCUMENTS

| | | | |
|---|---|---|---|
| 5,254,928 | 10/1993 | Young et al. | 320/125 |
| 5,349,535 | 9/1994 | Gupta | 320/106 |
| 5,854,549 | 12/1998 | Paulick | 320/110 |

*Primary Examiner*—Peter S. Wong
*Assistant Examiner*—Lawrence Luk
*Attorney, Agent, or Firm*—Zarley, McKee, Thomte, Voorhees & Sease; Dennis L. Thomte

[57] ABSTRACT

A smart power system of the present invention is adapted to provide battery power to portable systems in an improved and effective manner. The power system includes a battery pack having one or more battery cells and a memory storage IC. The memory storage IC supplies the microprocessors inside the portable system or charger with stored parameters that provide the system with required battery information. The system may also include various other tools for communicating with the battery pack for diagnostic, evaluation, programming, or tracking purposes.

14 Claims, 6 Drawing Sheets

SMART POWER SYSTEM

BACKGROUND OF THE INVENTION

1. Field of the Invention

The present invention relates to battery charging systems. More particularly, though not exclusively, the present invention relates to a method and apparatus for providing a smart power system.

2. Problems in the Art

In the field of battery charging systems, there are two main types of battery power systems, "smart" batteries and "dumb" batteries. "Dumb" batteries are simply batteries with no processing or memory storage capabilities. In contrast, "smart" batteries include some type of processing or memory storage capability. There are various problems associated with both "dumb" and "smart" battery power systems.

Prior art "dumb" batteries suffer from a number of problems that increase the cost of the device in which the battery is used. Problems with prior art "dumb" batteries include: the lack of acceptable run-time of the device powered by the battery; the lack of acceptable life-span of the battery pack; non-user-friendly batteries (i.e., a need for maintenance of battery packs in order to realize full performance; the need to have a separate charging system for each type of battery; the lack of user feed-back as to the state of the charge, remaining charge life, and other performance criteria; and the need for the user to provide technical assistance when maintaining a battery (i.e., the maintenance functions are not transparent to the user).

In addition to the problems that users face, original equipment manufacturers (OEM) have additional concerns with battery performance including: the inability to determine how old a battery actually is for warranty claims; the inability to determine the number of cycles a battery has gone through; the inability to determine a good battery from a bad battery when a battery is returned by a customer; and the lack of understanding of usage patterns and history which would help the manufacturer to design more robust, cost-effective battery packs.

Prior art "smart" batteries also suffer from a number of problems. Typical prior art smart batteries only provide the benefit of the availability of a "gas gauge" to provide an indication of the charge left in a battery. The importance of such a gauge is only important if the battery life of the device being powered lasts longer than the required work time. In the laptop computer market, for example, users typically never have enough run time. In the cellular and 2 way portable radio markets, users have enough run time most of the time, however this almost always comes with a trade-off, typically size or cost. Also, most battery gas gauges are voltage-dependent making them highly inaccurate.

Many prior art smart systems also do not provide any feedback to the user. Such a system may be performing a valuable service to the user, but with no means of feedback to the user (via an LCD, etc.). Additionally, prior art smart battery approaches have driven the need to put microprocessors inside the battery pack. Putting microprocessors inside a battery pack will increase the cost of the product.

FEATURES OF THE INVENTION

A general feature of the present invention is the provision of a method and apparatus for providing a smart power system that overcomes problems found in the prior art.

A further feature of the present invention is the provision of a method and apparatus for providing a smart power system which uses a battery with a memory storage IC which supplies microprocessors inside a portable device with stored parameters that provide the system with required battery information.

Further features, objects, and advantages of the present invention include:

A method and apparatus for providing a smart power system which takes care of battery maintenance functions transparently to a user.

A method and apparatus for providing a smart power system which uses the existing processors in the portable devices being powered by a battery pack.

A method and apparatus for providing a smart power system which ensures a fully charged battery.

A method and apparatus for providing a smart power system which increases the life cycle of the battery by charging the battery in the least destructive manner possible.

A method and apparatus for providing a smart power system which can be utilized with any rechargeable cell technology.

A method and apparatus for providing a smart power system which determines the best way to charge a cell.

A method and apparatus for providing a smart power system which may utilize an internal lock code inside the battery to prevent the charging of unauthorized batteries.

A method and apparatus for providing a smart power system which provides feedback to a user via a display unit on the charger or portable device.

A method and apparatus for providing a smart power system capable of providing a manufacturer with diagnostics and data relating to a batter returned to the manufacturer.

A method and apparatus for providing a smart power system which facilitates the downloading of information to provide a manufacturer with near real-time usage information via a wireless module.

A method and apparatus for providing a smart power system which includes a point-of-sale evaluation system.

These as well as other features, objects and advantages of the present invention will become apparent from the following specification and claims.

SUMMARY OF THE INVENTION

A smart power system of the present invention is used to provide battery power to portable systems. The invention is comprised of a battery pack having one or more battery cells and a memory storage device, and a battery charger having a microprocessor. A communications link provides a link between the microprocessor in the charger and the memory storage device. The portable device may also include a processor linked to the memory storage device. The invention optionally includes various other tools for communicating with the battery pack for diagnostic, evaluation, programming, or tracking purposes.

DETAILED DESCRIPTION OF THE PREFERRED EMBODIMENT

The present invention will be described as it applies to its preferred embodiment. It is not intended that the present invention be limited to the described embodiment. It is intended that the invention cover all alternatives, modifications, and equivalencies which may be included within the spirit and scope of the invention.

The smart power system of the present invention consists of a memory storage IC which has thermal sense capability inside the battery. The battery supplies the microprocessors inside a radio, phone, scanner, or other portable device, and the charger, with stored parameters that provide the system with required battery information. These processors will also store pertinent battery history in the battery IC as well.

The smart power system includes six sub-systems with the battery being the focal point. FIGS. 1–6 each illustrate one of the six sub-systems. The sub-systems include the phone/battery sub-system, the charger/battery sub-system, the on-line programming/battery sub-system, the point of sale analyzer/battery sub-system, the manufacturer evaluation/battery sub-system, and the download and tracking sub-system.

Figure 1:
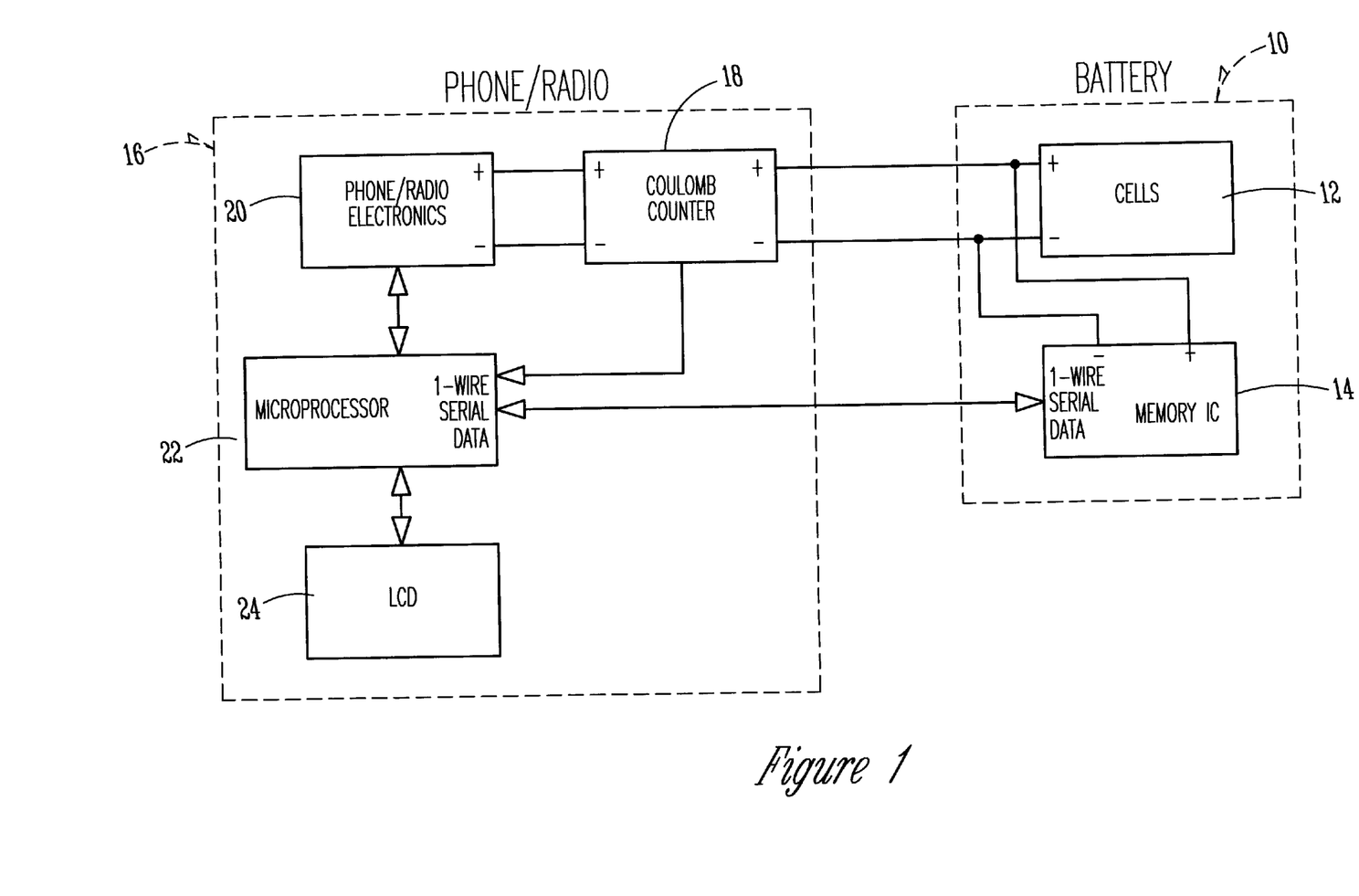
FIG. 1 is a block diagram of the phone/battery pack interface of the present invention.

FIG. 1 is a block diagram of the phone/battery pack interface of the present invention. FIG. 1 shows a battery pack 10 including interconnected battery cells 12 and a non-volatile memory storage integrated circuit (IC) 14 which includes a 1-wire serial data communication interface. One suitable IC is the Dallas Semiconductor DS2434 Battery ID Chip. The IC 14 has on-board non-volatile memory and thermal sense capability which reduces the cost of the battery pack 10 by removing a thermister. Additional components of the battery pack 10, such as diodes, thermostats, resistors, or Polyswitches, would be added as necessary.

FIG. 1 also shows a phone/radio device 16. The phone/radio device 16 could be comprised of a phone, radio, scanner, or other portable device. The phone/radio device 16. communicates with the battery pack 10 through the 1-wire serial data interface mentioned above. A Coulomb counter 18 is included with the phone/radio device 16 to ensure accurate capacity measurements. The phone/radio 16 also includes phone/radio electronics 20, a microprocessor 22, and an LCD display 24. The electronics 20, microprocessor 22, and display 24 are all parts of the phone/radio device 16, and are not, by themselves, a part of the present invention. The battery pack 10 utilizes the microprocessor 22 inside the phone/radio device 16 for programming, updating information, etc.

Figure 2:
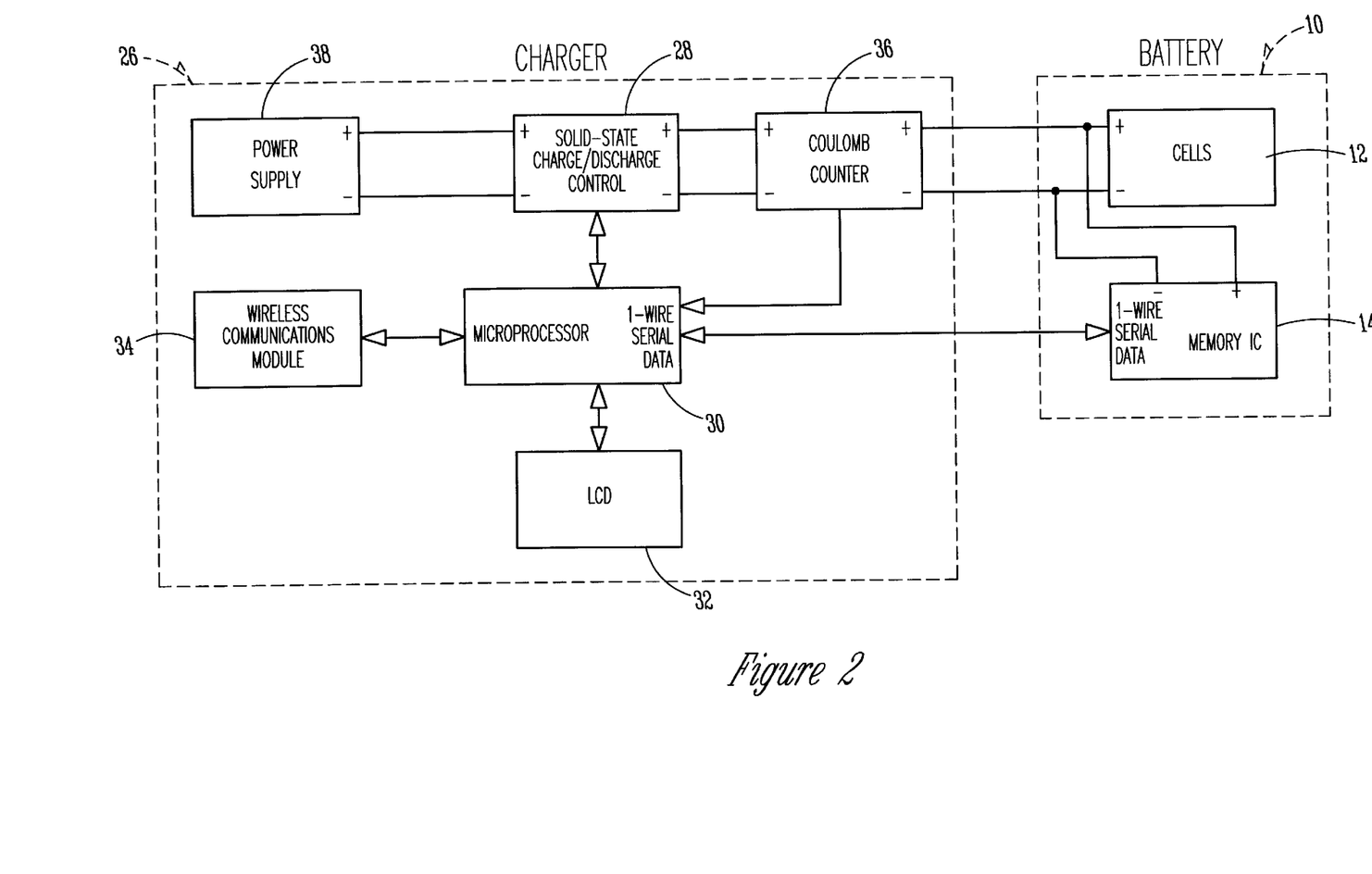
FIG. 2 is a block diagram of the charger/battery pack interface of the present invention.

FIG. 2 is a block diagram of the charger/battery pack interface of the present invention. FIG. 2 shows the battery pack 10 connected to a battery charger 26. The charger 26 includes internal software-adjustable solid-state current and voltage control circuitry 28, a micro-processor-based management system including a microprocessor 30, an LCD display 32, and an internal wireless communications module 34. The charger 26 also includes a Coulomb counter 36 and a power supply 38.

The charger 26 has the capability of providing constant-current and/or constant-voltage charging capabilities. The charger 26 communicates with the battery pack 10 through the 1-wire serial data interface mentioned above.

Figure 3:
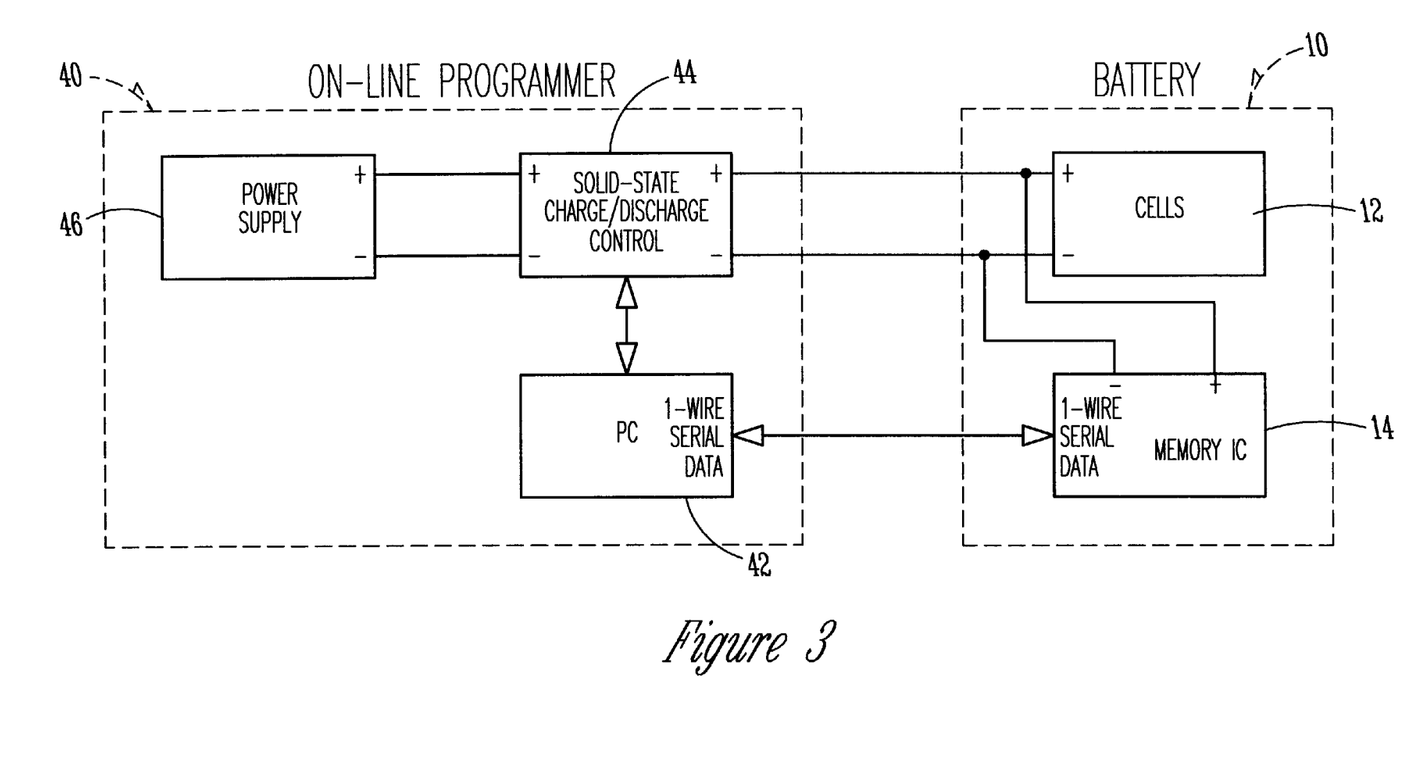
FIG. 3 is a block diagram of the on-line programming system/battery pack interface of the present invention.

FIG. 3 is a block diagram of the on-line programming system/battery pack interface. FIG. 3 shows the battery pack 10 connected to an on-line programming system 40. The programming system 40 includes a personal computer 42, solid-state charge/discharge control circuitry 44, and a power supply 46. The on-line programmer 40 communicates with the battery pack 10 through the 1-wire serial data interface mentioned above.

The on-line programmer 40 may be used as support hardware at the end of a battery manufacturing line. The on-line programmer 40 is used to test the electrical integrity of the battery pack 10 and also to pre-program the battery pack 10 with information such as the cell type, the cell manufacturer, the date code of cells, the date code of the pack, pre-loads for charging currents and voltages, and any other pertinent data that needs to be loaded into the battery at time of manufacture.

Figure 4:
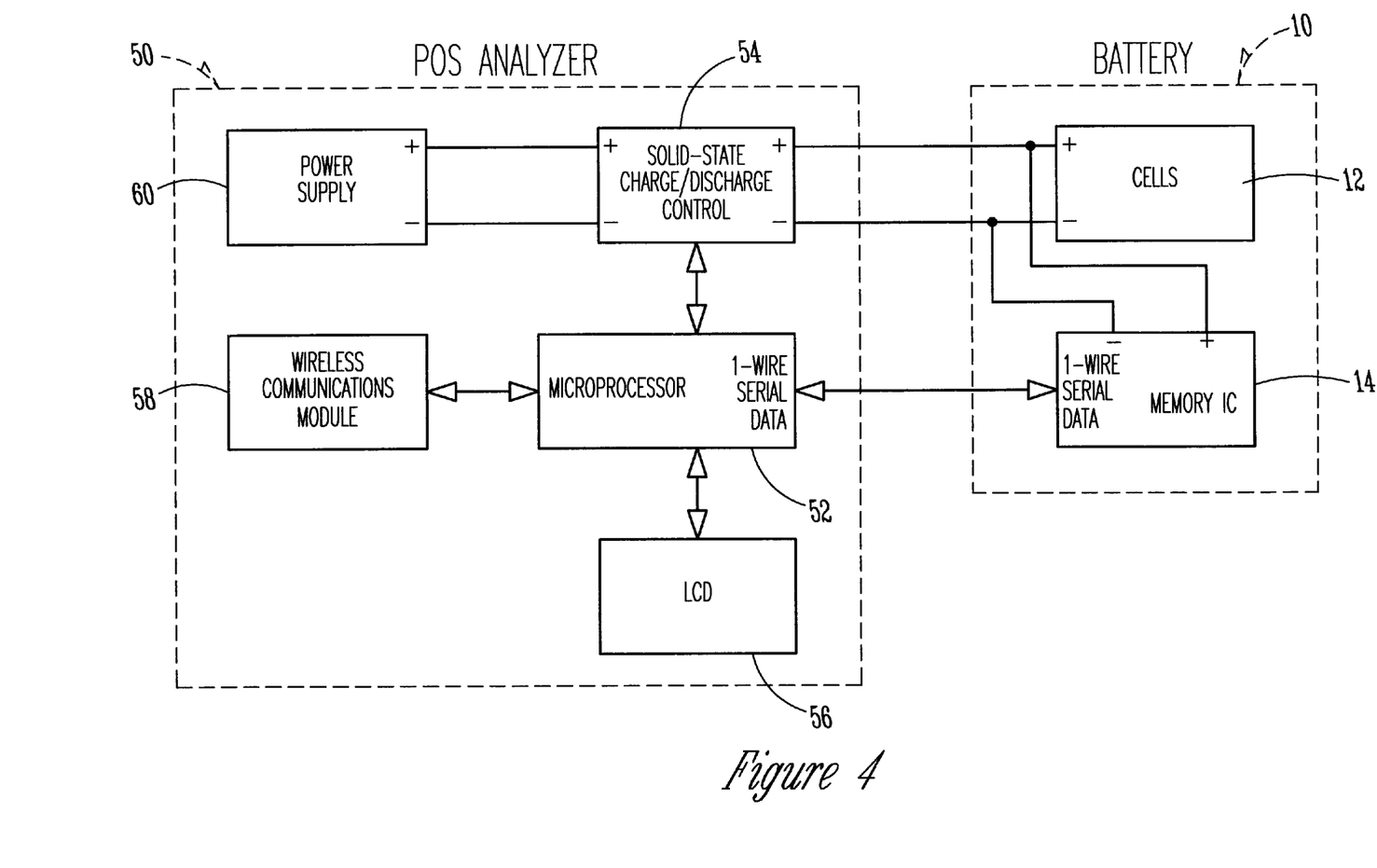
FIG. 4 is a block diagram of the point-of-sale analyzer/battery pack interface of the present invention.

FIG. 4 is a block diagram of the point-of-sale (POS) analyzer/battery pack interface of the present invention. FIG. 4 shows the battery pack 10 connected to the POS analyzer 50. The POS analyzer 50 includes a microprocessor 52, solid-state charge/discharge control circuitry 54, an LCD display 56, a wireless communication module 58, and a power supply 60. The POS analyzer 50 communicates with the battery pack 10 through the 1-wire serial data interface mentioned above.

The POS analyzer 50 preferably consists of a small, charger-sized test unit, onto which a sales clerk may place the battery pack 10 to be checked. After running diagnostic checks, the POS analyzer 50 will report, via the LCD display 56, the status of the battery pack 10 as well as any information which would help the clerk determine what action to take, i.e. where to send a bad battery, what to tell a user, etc.

Figure 5:
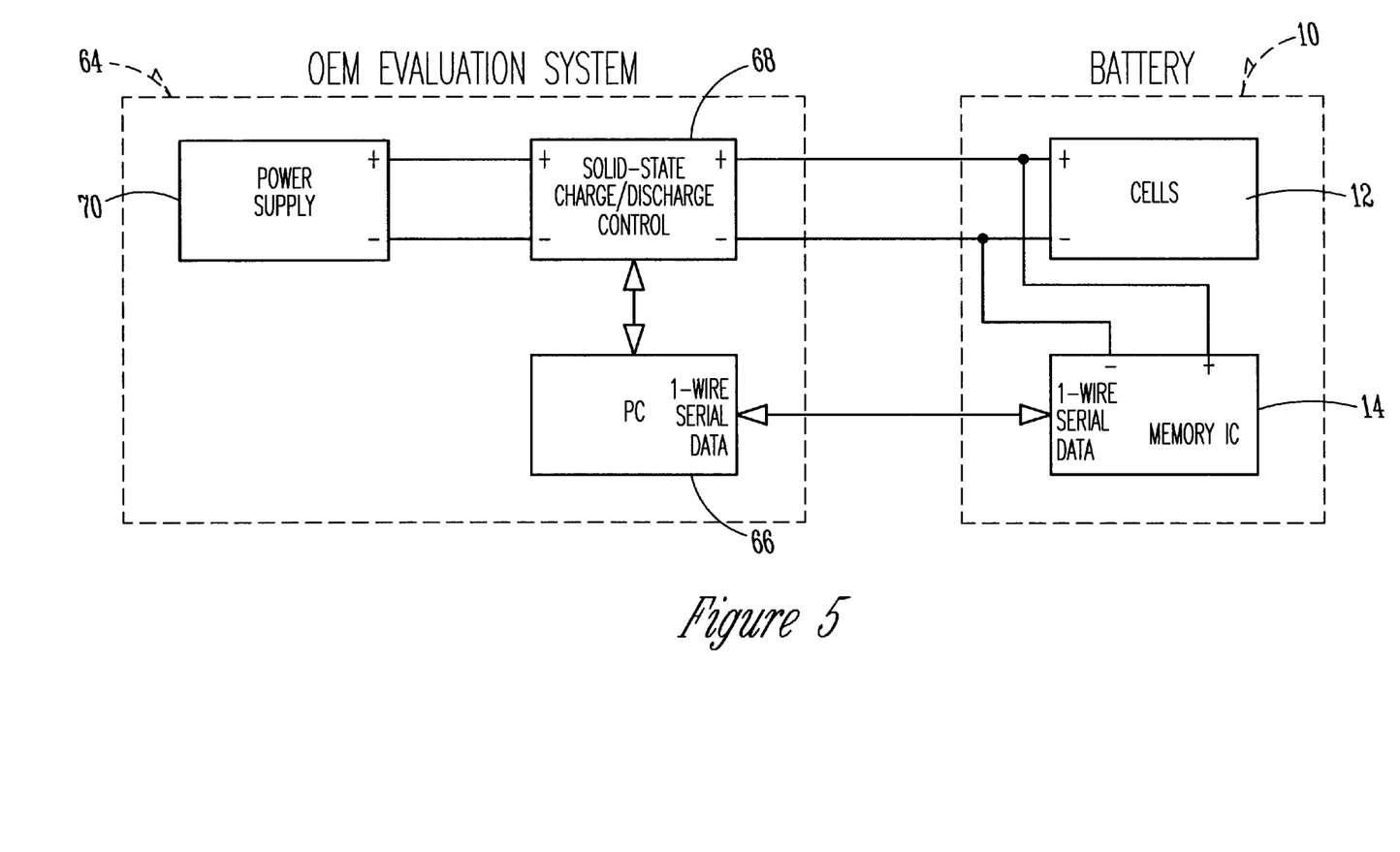
FIG. 5 is a block diagram of the manufacturer evaluation system/battery pack interface of the present invention.

FIG. 5 is a block diagram of the manufacturer evaluation system/battery pack interface of the present invention. FIG. 5 shows the battery pack 10 connected to the evaluation system 64. The evaluation system 64 includes, a personal computer 66, solid-state charge/discharge control circuitry 68, and a power supply 70. The evaluation system 64 communicates with the battery pack 10 through the 1-wire serial data interface mentioned above.

The evaluation system 64 allows a manufacturer of the battery pack 10 to evaluate the condition of battery packs which have been returned to the manufacturer. The evaluation system 64 allows a manufacturer to insert a returned battery pack 10 into a "reader" for a few seconds and the PC 66 does the rest. If the battery pack 10 has already been checked by the POS analyzer 50, the PC 66 would merely read the pertinent manufacturing information and a fault code. The system of the present invention allows a manufacturer to track customer returns and then sort their data by customer, region, fault code, cell type, etc. This information would allow the manufacturer to design better battery packs as well as protect themselves from warranty abuse.

Figure 6:
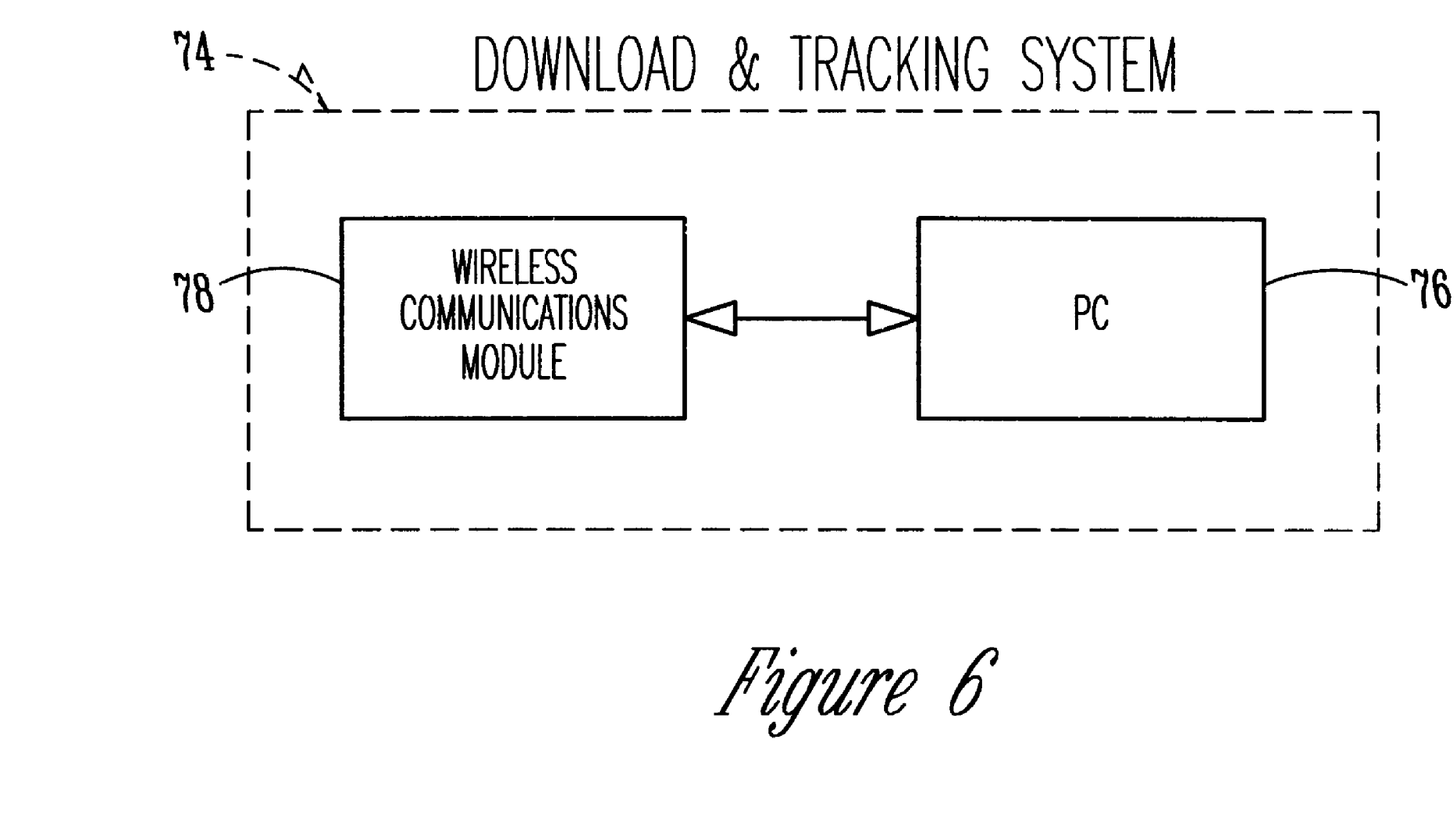
FIG. 6 is a block diagram of the download and tracking system of the present invention.

FIG. 6 is a block diagram of the download and tracking system of the present invention. The download and tracking system 74 includes a personal computer 76, and a wireless communications module 78. In the preferred embodiment, the battery pack manufacturer has an on-line communication system that will facilitate the downloading of software upgrades to the installed battery charger base. The download and tracking system 74 also tracks battery usage information in real time. Parameters that could be monitored include: the age of battery, the number of charging/discharging cycles the battery has undergone, the maximum temperature of the battery during any time period, the minimum temperature of the battery during any time period, and demographic information (usage patterns, etc.) about the battery pack 10. The manufacturer could also have the phone download pertinent usage information to the battery pack 10, to be sent from the charger communications system.

The cost of the battery pack 10 can be kept to a minimum by using the existing processor in the portable devices and charges as described above. However, more functions could be performed in the battery pack IC.

The software used with the smart power system of the present invention consists of various algorithms in the phone/radio 16, the charger 26, the on-line programmer 40, the POS analyzer 50, the manufacturer evaluation system 64, and the download and tracking system 74. The software in the phone/radio 16 includes a monitoring, communications, and display algorithm. The software in the charger26 includes a charge, monitoring, communications, and display algorithm. The on-line programmer 40 includes testing/programming software. The software for the six sub-systems is written accomplish the various functions outlined above.

Preferably, the software for the present invention will be written "generically" to keep from having to upgrade the system more than necessary. The battery pack 10, when programmed, fills in all the battery specific information required by the software in the battery charger 26 and phone/radio 16. The software in the charger 26 is stored in non-volatile memory. Upgrades to the software are downloaded via the communications module 24, by the manufacturer, transparent to the user. The manufacturer may put a note on the charger LCD display 32 letting the end user know that an upgrade has been performed. The system is also be self-calibrating.

The software utilizes sophisticated algorithms to determine the best way to charge the battery pack 10 based on the cell type, the cell manufacturer, the age of cells, etc. The number of possible charge solutions for any given cell type is in the tens of thousands so the system will be quite versatile.

The hardware and software of the smart power system of the present invention are configured to provide various functions and benefits outlined below.

One benefit of the smart power system is that the system takes care of the battery maintenance function transparently. Many prior art systems require a user to make choices as to what should be done to properly maintain a battery.

One important function of the smart power system is that the system will fully charge the battery pack 10 each time it. is charged. The system includes charging algorithms that will eliminate voltage depression, dendrite shorts, and any other problem that could keep the battery from fully charging. This ensures that the battery will run as long as possible. These algorithms also take into account the individual usage pattern of the end user.

The system is also to increase the cycle life of the battery by charging the battery in the least destructive manner possible. This charging method is dependent on many factors such as the environment the battery is used in, the application the battery is used in, the cell type and manufacturer of the battery, the age of the battery (time and cycles), and the required charge time.

As mentioned above, the system works transparent to the end user, i.e., the system requires the user to do nothing to maintain the battery. Currently, many manufacturers include "charging instructions" with each battery to tell the user how to get the most capacity and cycle life out of each battery pack. The present invention makes battery maintenance transparent to the end user. For example, for certain types of rechargeable batteries, it is beneficial to occasionally discharge the battery down to a nominal cutoff voltage before recharging. The present invention will recognize this and perform this function automatically.

Another important function of the present invention is to be able to utilize Ni—Cd, Ni—MH, Li-Ion, Li-Polymer, Zn-Air, Rechargeable Alkaline, for example, and any other rechargeable cell technology that is developed. The system will do this by storing the pertinent charge/discharge parameters in the battery which will keep the charging system itself "generic". In this way, the charger is able to charge any old or new cell technology that is used. When a new cell technology is introduced that requires a software modification, the manufacturer can download the new software (transparent to the end user) via the onboard communications system 34 in the charger 26. The main advantage of this is that the end user will only buy one charger throughout the life of the product regardless of the battery type used.

The present invention also allow the use of low cost cells. Since the charger is "programmed" by the battery, the charger will be able to determine the best way to charge any cell. Therefore, lower cost cells could be utilized in many applications. Many low cost cells will perform quite acceptably if they are charged properly. This allows for implementation of very low cost smart batteries.

The present invention may also utilize an internal lock code inside the battery pack 10 to prevent the charger from charging an unauthorized battery.

Another important function of the present invention is to provide feedback to the user, via the LCD display 32 on the charger 26 and phone/radio 16. Displayed information can include any of the following items.

First, the system can display to the user the amount of "talk time" left in the battery. This determination can be made extremely accurate by basing the information on recent duty cycle usage profiles for that user. The "talk time" information could be reported in terms of actual minutes of talk time or standby time, for example. As a battery ages and the charge capacity is no longer at a high level, the system may inform the user that they may not want to use that battery in "life critical" applications, or, that it is time to replace the battery. The system may also inform the user of an impending disconnect as the battery approaches end of its discharge. In this case, the system will let the user know (down to the minute) how much time is remaining in their battery before the disconnect. The system may also inform the user of the need to replace the battery near the end of its useful life of the battery in order to get the most performance from the communications system with which the battery is used. The system may also provide battery recycling information to the user, as well as inform the user when a new software upgrade has been downloaded. The system may also display to the user information relating to new batteries that are available for their portable device, new accessories available, and new products or services available from the manufacturer.

Another important function of the present invention is to provide the manufacturer with diagnostics and data when a battery is returned to them by a user. Such information may include the number of cycles on the battery; the last capacity of the battery; the highest current draw the battery supplied and for how long; the highest and lowest temperatures the battery was exposed to; the cell type, size, manufacturer, and date code; the manufacturing date code of battery; the identification of the customer that purchased this battery; and the failure mode.

With the internal wireless communication module 34 (FIG. 2), the charger 26 is capable of downloading or uploading the information mentioned above daily to provide the manufacturer with near real-time usage information. This information would be an extremely powerful tool upon new product release, since real-time usage data can be extracted from the field. Information on phone performance could be downloaded as well to give the manufacturer a quick look at the field performance of the a system within a short period of time.

The manufacturer may use the POS analyzer 50 (FIG. 4) to reduce the number of warranty-returned batteries from the field. A significant percentage of all batteries returned from the field have no problem with them. Having a test system (such as POS analyzer 50) available to the point-of-sale clerk to verify the integrity of the battery in a few minutes could prevent unnecessary battery returns. If the battery is found to be bad, the POS analyzer 50 could plug a code into the battery memory IC 14 stating the cause of failure. When the battery pack 10 is returned to the manufacturer, the manufacturer could process the battery through the manufacturer evaluation system 64 (FIG. 5), then forward the battery to the appropriate place for warranty replacement with accurate cause-code information.

The preferred embodiment of the present invention has been set forth in the drawings and specification, and although specific terms are employed, these are used in a generic or descriptive sense only and are not used for purposes of limitation. Changes in the form and proportion of parts as well as in the substitution of equivalents are contemplated as circumstances may suggest or render expedient without departing from the spirit and scope of the invention as further defined in the following claims.

What is claimed is:

1. A smart battery power system comprising:
   a battery pack having at least one battery cell and a memory storage device;
   a battery charger having a power supply and a microprocessor; and
   a communication link between the microprocessor and the memory storage device for transmitting information between the memory storage device and the battery charger.

2. The smart battery power system of claim 1, wherein the battery charger further comprises a Coulomb counter.

3. The smart battery power system of claim 1, wherein the battery charger further comprises a communications module electrically connected to the microprocessor for uploading or downloading data relating to the battery pack in exchange with a remote system.

4. The smart battery power system of claim 1, further comprising a portable device having a second microprocessor, wherein the battery pack supplies power to the portable device and the second microprocessor is linked to the memory storage device.

5. The smart battery power system of claim 1, further comprising a programming device selectively connectable to the battery pack for programming the memory storage device with information relating to the battery cell.

6. The smart battery system of claim 1, wherein the battery charger further comprises a communications module electrically connected to the microprocessor for communicating with a remote system, said remote system comprising a tracking system having a second communication module for communicating with the battery charger.

7. The smart battery power system of claim 6, wherein the tracking system uploads software updates to the battery charger.

8. The smart battery power system of claim 7, wherein the tracking system receives information relating to battery usage information from the battery charger to in order to track battery usage information.

9. A method of supplying power to a portable device comprising the steps of:
   providing a battery pack having at least one battery cell and a memory storage device;
   providing a battery charger for charging the battery pack, the battery charger including a communication link with the memory storage device of the battery pack;
   placing the battery pack in electrical contact with the battery charger;
   transmitting information relating to the battery from the memory storage device to the battery charger;
   charging the battery pack in a manner dependent upon the transmitted information; and
   placing the battery pack in electrical contact with the portable device to provide power to the portable device.

10. The method of claim 9, wherein the transmitted information includes data related to at least one of: the environment the battery is used in, the battery cell type, and the battery cell manufacturer.

11. The method of claim 11 further comprising the steps of:
   providing a processor with the portable device;
   linking the processor with the memory storage device when the battery pack is placed in electrical contact with the portable device; and
   transmitting information relating to the battery pack from the memory storage device to the processor.

12. The method of claim 11 further comprising the steps of:
   providing the battery charger with a communications module for communicating with a remote system; and
   downloading information from the remote system to the battery charger.

13. The method of claim 12, further comprising the step of downloading software upgrades from the remote system.

14. The method of claim 9, wherein the portable device has a coulomb counter.

* * * * *